A. BAUER.
MICROSCOPE.
APPLICATION FILED JULY 24, 1922.

1,429,557. Patented Sept. 19, 1922.
2 SHEETS—SHEET 1.

Patented Sept. 19, 1922.

1,429,557

UNITED STATES PATENT OFFICE.

AUGUST BAUER, OF WETZLAR, GERMANY.

MICROSCOPE.

Application filed July 24, 1922. Serial No. 577,104.

*To all whom it may concern:*

Be it known that I, AUGUST BAUER, a citizen of the Republic of Germany, residing at Wetzlar, Germany, have invented Improvements in Microscopes (for which application has been filed in Germany February 4, 1921), of which the following is a specification.

This invention relates to an improvement in microscopes of that type in which fine adjustment mechanism is provided for the body tube.

The object of the invention generally is to ensure an accurate and smooth working movement of the fine adjustment mechanism, being intended to effect the movement of the dove tailed slide or other slide usually employed. To effect such movement it was hitherto necessary in microscopes with which I am familiar to grind the slide very carefully to its guide and to employ a lubricant of the best quality.

A further object of the invention is a simple manufacturing method whereby the manufacture may be effected on an economical basis. To these ends freely movable balls supported by special holders or retainers are arranged between the slide and its guide. For affording seats or raceways for the balls grooves of any suitable form are provided both in the slide and its guide.

Although the form of the slide and of its corresponding guide is not of importance, a simple accurately working device may be obtained by choosing as a slide a plane-parallel plate and as a guide two plane-parallel surfaces between which the sliding plate is moved, a roller bearing retainer together with a plurality of balls being disposed on either side of the slide.

With these general statements of the objects of the invention I will now proceed to describe one embodiment thereof and the manner in which the invention may be carried out. It will be understood that while I have described what may be considered as a preferable embodiment of the invention, I do not limit myself to the precise constructions herein set forth, as they may be varied by those skilled in the art in accordance with the particular purposes for which they are intended, and the conditions under which they are to be utilized.

Figure 1:
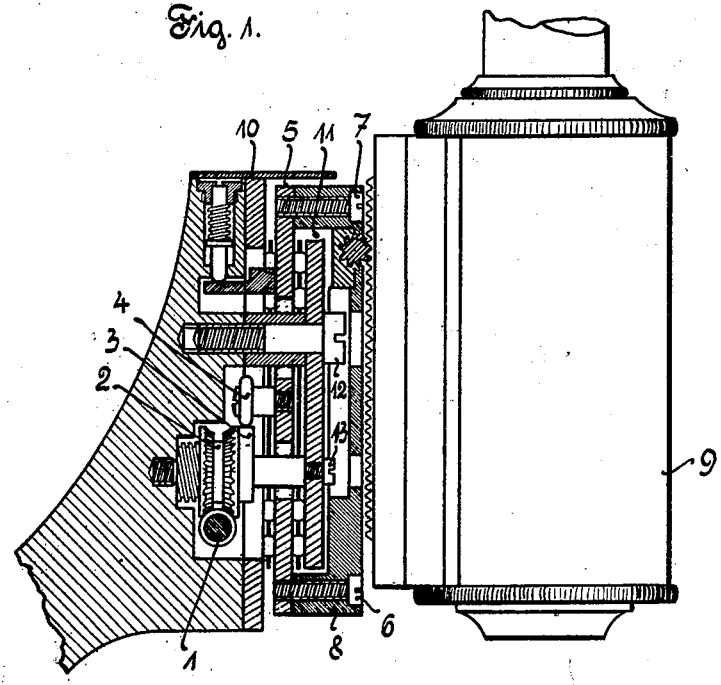
Figure 3:
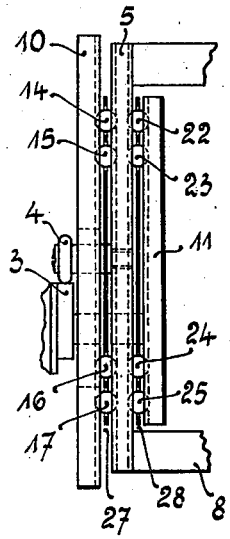
Figure 2:
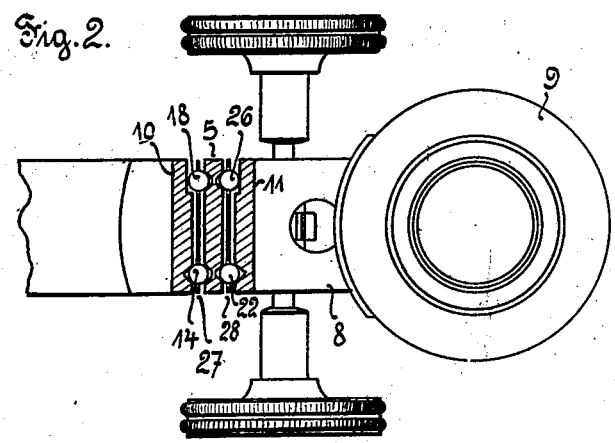
Figure 4:
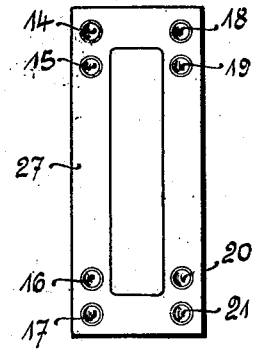
Figure 5:
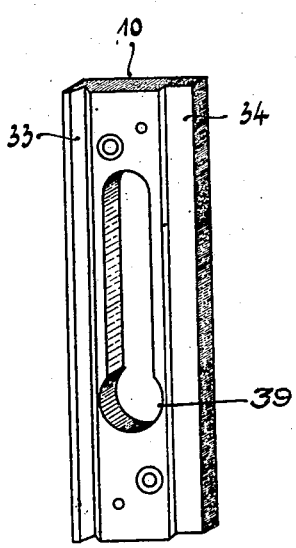
Figure 6:
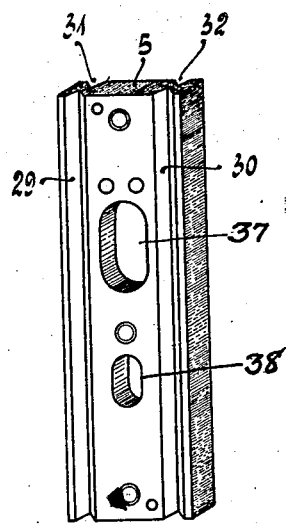
Figure 7:
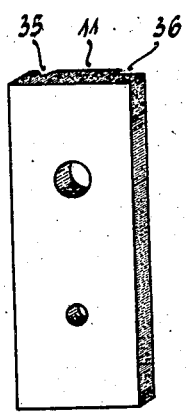

In the accompanying drawing Figure 1 is a vertical section of an improved fine adjustment and Figure 2 a horizontal section. Figure 3 is a vertical section of the sliding and guide parts proper. Figure 4 is a view of a holder of balls. Figures 5, 6 and 7 are perspective views of the sliding and two corresponding guide parts.

The fine adjustment mechanism, as shown in Figure 1, comprises a worm screw 1 engaging in a worm wheel 2 to which a heart shaped cam 3 is connected. At the periphery the cam 3 is bounded by two symmetrical spiral curves, so that equal angular displacements of the cam produce equal linear displacements of the crest of the cam. This vertical motion is transmitted by a steel roller 4 attached to a plane-parallel sliding plate 5. Screws 6 and 7 fix the plate 5 on a carrier 8 of a body tube 9. The sliding plate 5 is placed inside of two plane-parallel guide plates 10 and 11, both fixed on the upper body of the stand, the plate 10 directly and the plate 11 by means of screws 12 and 13. The distance between the two plane-parallel guide plates 10 and 11 should be accurately adjusted. To render the movement of the sliding plate 5 possible and provide clearances for the bolts 12 and 13, the plate 5 is provided with elongated openings 37 and 38 through which the screws 12 and 13 respectively pass. The plate 10 is provided with an elongated opening 39 through which the attaching screws 12 and 13 and other fixing means pass. In the space between the sliding plate 5 and guide plate 10 there is disposed a holding and retaining plate 27 together with its set of eight balls 14, 15, 16, 17, 18, 19, 20, 21 and a similar plate 28 is disposed between the slide and guide 11, containing a set of eight balls (only 22 to 26 being apparent). These ball bearings may be of a diameter of about 3 mm. and the holders or retaining devices 27 and 28 may be formed of a metal frame of about 0.3–0.5 mm. thickness. The ball grooves or raceways 29, 30, 31 and 32 are provided on both sides of the sliding plate 5 with which correspond grooves 33 and 34 in the guide plate 10 and grooves 35 and 36 in the guide plate 11.

After the microscope is adjusted by the main mechanism to an approximate position the finer and more accurate adjustment is then effected through the medium of the mechanism described. The worm shaft 1 is rotated to actuate the heart-shaped cam 3 which in turn engages the roller 4 and moves the slide 5.

Having thus described my invention, what I claim and desire to secure by Letters Patent is:

1. A microscope comprising a support having a guide member carried thereby, a microscopic tube adjustable with respect to said support and having a sliding member cooperating with said guide, freely movable rolling members disposed between the guide and the sliding member and a retaining member also disposed between the guide and the sliding member for retaining the rolling members in spaced relation.

2. In a microscope a mechanism for fine focussing the microscopic tube comprising a sliding member connected to the tube, guide members between which the sliding member is disposed, freely movable rolling members located between the sliding member and its guide members and holder elements separate from and also disposed between the slide and its guide members for supporting and retaining said rolling members in spaced relation.

3. In a microscope a mechanism for fine focussing the microscopic tube comprising a plane parallel sliding plate connected to the tube, two plane parallel guide surfaces between which the plane parallel sliding plate is arranged, freely movable balls located between the sliding plate and its guide surfaces and holder elements separate from and also disposed between the slide plate and the guide surfaces for supporting and retaining said balls in spaced relation, grooves being provided both on the sliding plate and its guide sides along which the balls travel.

4. In a microscope the combination of a main adjusting mechanism with a fine focussing mechanism for the microscopic tube comprising a plane parallel sliding plate connected thereto, two stationary plane parallel guide plates between which the plane parallel sliding plate is adapted to move, freely movable balls located on either side of the sliding plate and between the sliding plate and its guide plates, and holder elements separate from and also disposed between the sliding plates and its guide plates for retaining said balls in spaced relation, grooves being provided both on the sliding plate and its guide plate along which the balls travel.

5. In a microscope, a mechanism for fine focussing the microscopic tube comprising a plane parallel sliding plate connected to the tube, two plane parallel guide plates between which the plane parallel sliding plate is arranged and a rolling bearing unit disposed between each of the parallel guide plates and the sliding plate comprising a retaining plate and a plurality of ball bearings of a greater diameter than the thickness of the retaining plate and passing through openings therein to project on both sides thereof into engagement with the guide and sliding plates.

In testimony whereof, I have signed my name to this specification.

AUGUST BAUER.

Witnesses:
F. H. ANDERSON,
BASIL G. SAVARD.